(12) United States Patent
Esders et al.

(10) Patent No.: US 11,131,378 B2
(45) Date of Patent: Sep. 28, 2021

(54) LUBRICATING/OIL-COOLING DEVICE

(71) Applicants: POLYTEC PLASTICS GERMANY GMBH & CO. KG, Lohne (DE); Gabriele Josefa Batke-Thiesen, Dinklage (DE)

(72) Inventors: Helen Esders, Lohne (DE); Hans Janssen, Dinklage (DE); Uwe Thiesen, Dinklage (DE); Timur Kasimov, Damme (DE)

(73) Assignee: Polytec Plastics Germany GMBH, Lohne (DE)

( * ) Notice: Subject to any disclaimer, the term of this patent is extended or adjusted under 35 U.S.C. 154(b) by 267 days.

(21) Appl. No.: 16/480,504

(22) PCT Filed: Feb. 6, 2018

(86) PCT No.: PCT/EP2018/052870
§ 371 (c)(1),
(2) Date: Jul. 24, 2019

(87) PCT Pub. No.: WO2018/149688
PCT Pub. Date: Aug. 23, 2018

(65) Prior Publication Data
US 2019/0390760 A1 Dec. 26, 2019

(30) Foreign Application Priority Data
Feb. 15, 2017 (DE) .......................... 102017202389.9

(51) Int. Cl.
*F16H 57/04* (2010.01)

(52) U.S. Cl.
CPC ......... *F16H 57/0412* (2013.01); *F16H 57/04* (2013.01); *F16H 57/0421* (2013.01);
(Continued)

(58) Field of Classification Search
None
See application file for complete search history.

(56) References Cited

U.S. PATENT DOCUMENTS 5,676,221 A * 10/1997 Renk ...................... F16H 57/029
184/6.12
6,267,203 B1 * 7/2001 Brissette ............. F16H 57/0483
184/6.12

(Continued)

FOREIGN PATENT DOCUMENTS

| CN | 101487529 A | 7/2009 |
| DE | 10318070 A1 | 11/2004 |

(Continued)

OTHER PUBLICATIONS

International Search Report for International Application No. PCT/EP2018/052870 dated Mar. 27, 2018.

*Primary Examiner* — Colby M Hansen
(74) *Attorney, Agent, or Firm* — Nexsen Pruet, PLLC; Seth Hudson

(57) ABSTRACT

A device for providing a transmission with a lubricant or for oil-cooling a piston in the engine of a motor vehicle, comprising a lubricant- or oil-distribution pipe having at least one injection pipe branching off therefrom for delivering the lubricant or the oil to the respective components of the transmission or the engine, and a method for producing same.

9 Claims, 3 Drawing Sheets

(52) U.S. Cl.
CPC ..... *F16H 57/0423* (2013.01); *F16H 57/0479* (2013.01); *F16H 57/0482* (2013.01)

(56) References Cited

U.S. PATENT DOCUMENTS

| | | |
|---|---|---|
| 2015/0285368 A1 | 10/2015 | McLauchlan |
| 2016/0025205 A1 | 1/2016 | Smith et al. |
| 2019/0323394 A1* | 10/2019 | Kiyokami ........... F16H 57/0441 |

FOREIGN PATENT DOCUMENTS

| | | |
|---|---|---|
| DE | 102010033480 A1 | 2/2011 |
| DE | 102012109133 A1 | 3/2014 |
| JP | 2016-048042 A | 4/2016 |

\* cited by examiner

LUBRICATING/OIL-COOLING DEVICE

FIELD OF THE INVENTION

The invention relates to a device for supplying a gear with a lubricant or for the oil-cooling of a piston in the engine of a motor vehicle, comprising a lubricant or oil distributor pipe having at least one spray pipe branching off therefrom for supplying the lubricant or oil to the respective components of the gear or engine, and to a process for the preparation thereof.

BACKGROUND OF THE INVENTION

In engines and gears of passenger cars, the gearwheels or pistons must be lubricated with oil. The lubrication is optimum if a small oil jet impinges directly in front of the contact zone of two gearwheels or on the piston and wets the gear interlocking zone with oil. Similarly, pistons in the engine are cooled with oil. For this, it is required that oil is guided to each cylinder, and oil is injected through a nozzle.

Such oil distributor pipes with nozzles are complex constructions that are normally assembled from several individual parts.

DE 103 18 070 A1 describes a device and process for lubricating and cooling gear drives, comprising a supply line for supplying lubricating and cooling oil from an oil sump into a first canal connected with the supply line and provided in a spray pipe, connected with at least one first nozzle for selectively spraying the lubricating and cooling oil in lubrication-intensive regions of the gear that are assigned to the first canal, wherein the supply line is connected with at least one second canal and at least one second nozzle communicating with the second canal for selectively spraying in lubrication-intensive regions assigned to the second canal, and wherein a control valve is provided, through which the canals can be switched.

From DE 10 2010 033 480 A1, a device and process for supplying a gear with lubricant are known. In order to improve the oil lubrication of gears, especially dual clutch transmissions with two gearbox units, it is proposed that the device supplies the lubricant only to those components that form the respectively load-leading gear or to the load-leading gearbox unit. In particular, a system of pipes, for example, steel pipes, is assembled with small preformed nozzles that are injected into a plastic intake. Several such plastic-metal modules are then assembled to one pipe system and clipped. Thus, such a pipe system consists of 5 to 10 individual parts. The pipes must be produced individually, and reshaped. The pipes must be injection-molded to small pipe packages. In a third step, the pipe packages are assembled to an overall module. Reshaped metal tubes are used to shape the nozzles.

BRIEF SUMMARY OF THE INVENTION

In contrast, it is the object of the present invention to provide oiling systems that have a simple construction. The production is to be automated if possible, and the components should be made of plastic and thus be lightweight.

DESCRIPTION OF THE DRAWINGS

The present invention is illustrated and described herein with reference to the various drawings, in which like reference numbers denote like method steps and/or system components, respectively, and in which.

DESCRIPTION OF THE INVENTION

Figure 1:
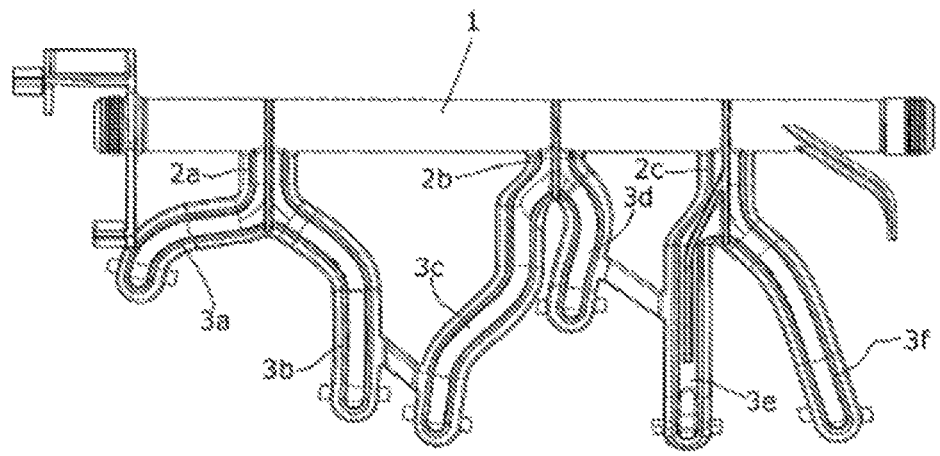
FIG. 1 shows a device according to the present invention.

In a first embodiment, the above object is achieved by a device for supplying a gear with a lubricant or for oil-cooling a piston in the engine of a motor vehicle, comprising a lubricant or oil distributor pipe 1 having at least one spray pipe 2a, 2b, 2c branching off therefrom for supplying the lubricant or oil to the respective components of the gear or engine, characterized in that said spray pipe 2a, 2b, 2c comprises first half shells and second half shells that are connected with one another by bonding connections in the region of the contact surfaces of the joining seam between the first half shells 3a, 3b, 3c, 3d, 3e, 3f and the second half shells 4a, 4b, 4c, 4d, 4e, 4f.

As compared to the prior art, a pipe system that consists of at least one, but especially a plurality, of small tubes 2a, 2b, 2c running in the space and needing no metal/plastic bonding is replaced by a simply prepared pipe system, especially of plastic pipes, which is integrally assembled by injection molding or welded.

FIG. 1 shows a device according to the invention for supplying a gear with a lubricant or for oil-cooling a piston in the engine of a motor vehicle, comprising a lubricant or oil distributor pipe 1. From said lubricant or oil distributor pipe 1, three spray pipes 2a, 2b, 2c branch off and respectively open into branches. The first half shells 3a, 3b, 3c, 3d, 3e, 3f shown here form the lower sides of the spray pipes 2a, 2b, 2c.

Figure 2:
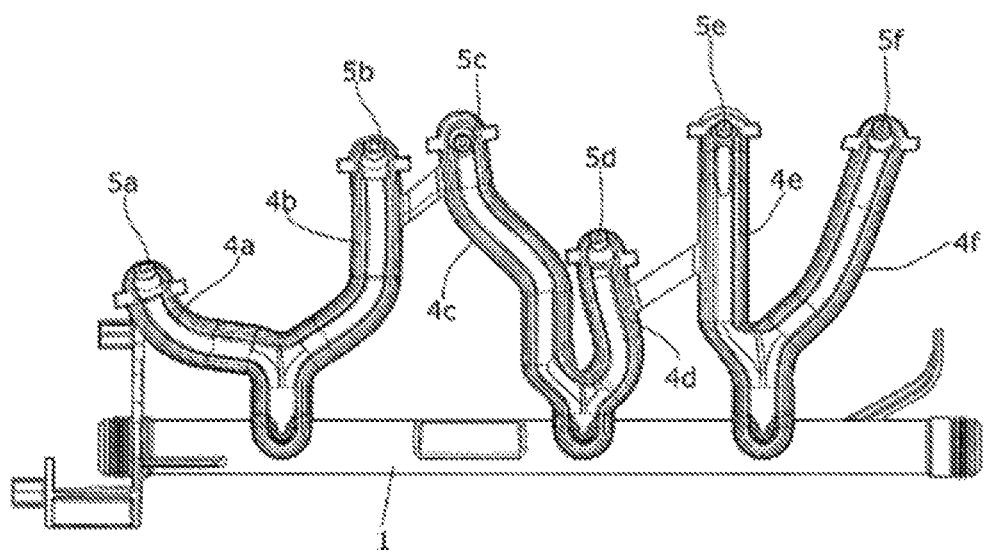
FIG. 2 shows a top view of the device according to the present invention.

FIG. 2 shows a top view of the device according to the invention. In particular, the second half shells 4a, 4b, 4c, 4d, 4e, 4f are shown, which are respectively provided with nozzles 5a, 5b, 5c, 5d, 5e, 5f in their ends.

Figure 3:
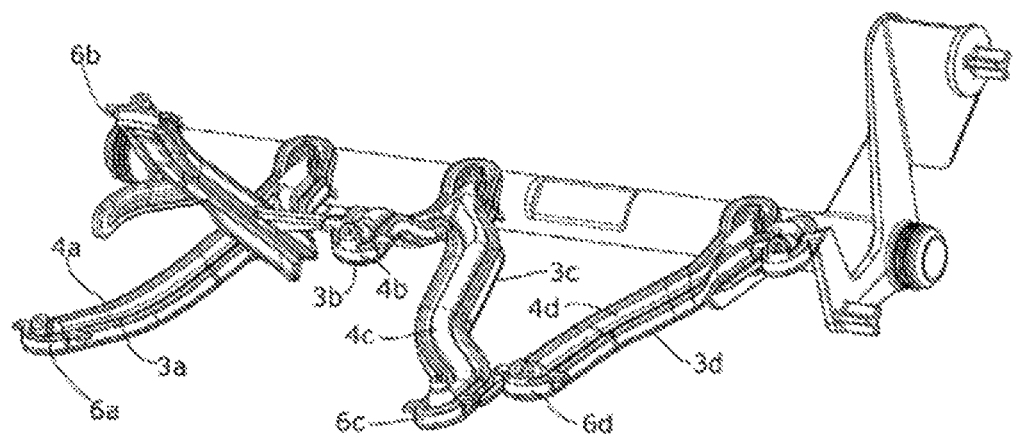
FIG. 3 the joining material that connects the first half shells with the second half shells.

FIG. 3 highlights the joining material 6a, 6b, 6, 6d, which connects the first half shells 3a, 3b, 3c, 3d, 3e, 3f with the second half shells 4a, 4b, 4c, 4d, 4e, 4f.

Figure 4:
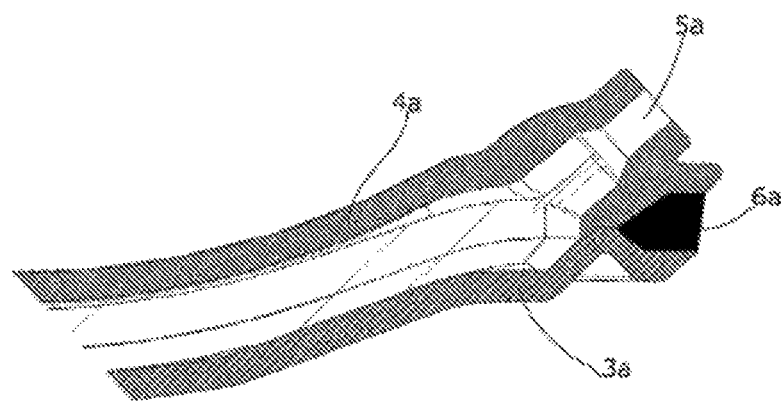
FIG. 4 shows the nozzle of the present invention.

FIG. 4 shows the nozzle 5a, which is integrated in the spray pipe 2a, as well as the joining material 6a, 6b, 6c, 6d, which connects the first half shell 3a with the second half shell 4a.

Figure 5:
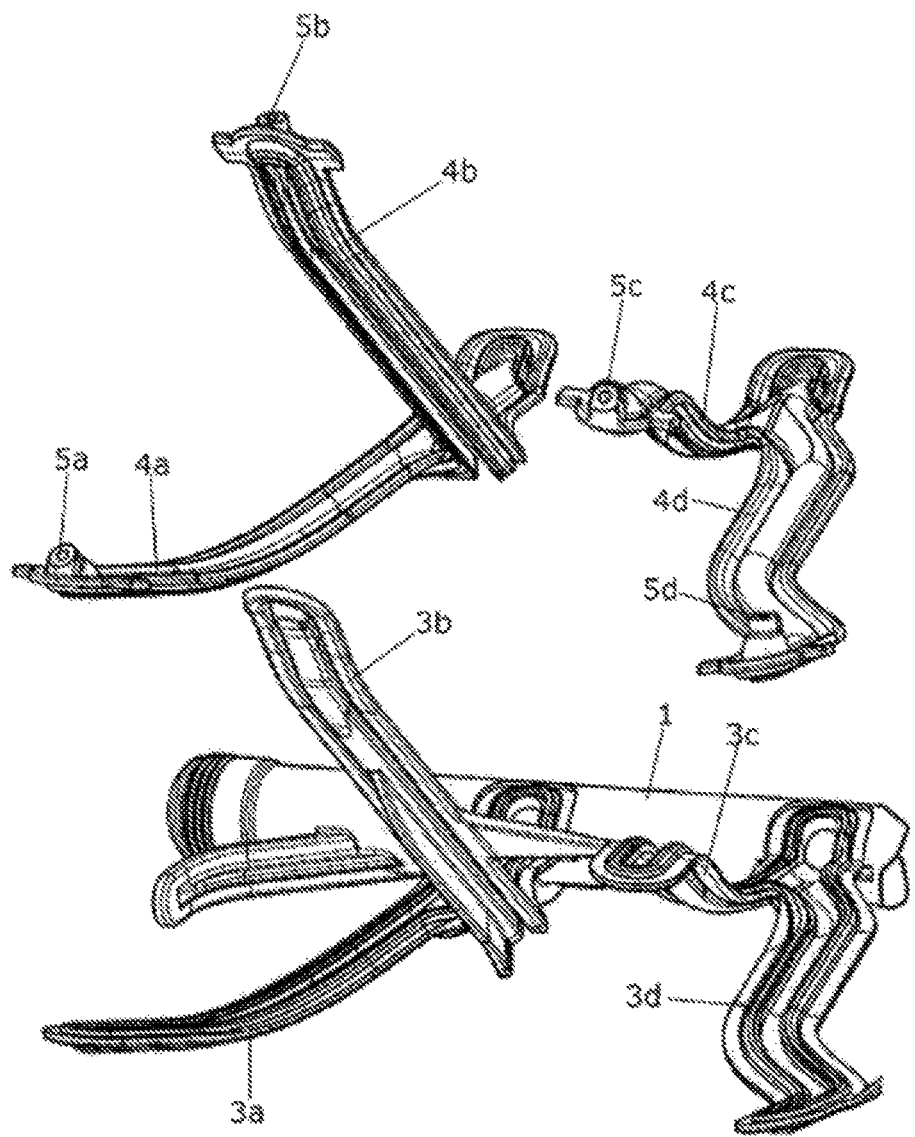
FIG. 5 shows the first half shells separated from the second half shells.

FIG. 5 shows the first half shells 3a, 3b, 3c, 3d separated from the second half shells 4a, 4b, 4c, 4d. These shells are produced independently of one another, for example, by injection molding and subsequently by welding or by means of a joining material 6a, 6b, 6c, 6d (not shown).

If reference is made to a spray pipe 2a in the description of the present invention, this term is to be understood to include the case of several spray pipes 2a, 2b, 2c. The spray pipes consist of at least two half shells 3a, 3b, 3c, 3d, 3e, 3f, 4a, 4b, 4c, 4d, 4e, 4f, which are injection-molded together through a third component into a closed pipe system.

The half pipes can be combined in a mold. After injection, the contour plates of the mold are shifted or rotated in such a way that the second half shells 4a, 4b, 4c, 4d and the first r half shells 3a, 3b, 3c, 3d, 3e, 3f are placed on top of one another to form a closed pipe together.

In a second injection process, the two half shells 3a, 3b, 3c, 3d, 3e, 3f, 4a, 4b, 4c, 4d, 4e, 4f are then molded by injecting the joining seam in such a way that the contact surfaces of the two half shells are molten together with the now injected joining material 6a, 6b, 6c, 6d, and the two half shells 3a, 3b, 3c, 3d, 3e, 3f, 4a, 4b, 4c, 4d, 4e, 4f are connected by a bonding connection through the joining material 6a, 6b, 6c, 6d thereby.

The overmolding creates a connection between the half shells 3a, 3b, 3c, 3d, 3e, 31, 4a, 4b, 4c, 4d, 4e, 4f by melting the surfaces of the pipe upper and lower parts. In order that no melt gets into the interior of the pipe, the two half shells 3a, 3b, 3c, 3d, 3e, 3f, 4a, 4b, 4c, 4d, 4e, 41 should be pressed together at sealing surfaces in such a way that the overmolded component has no possibility to reach the interior region of the pipe. Thus, a spray pipe 2a, 2b, 2c consisting of at least two half shells 3a, 3b, 3c, 3d, 3e, 3f, 4a, 4b, 4c, 4d, 4e, 4f is formed, being open inside and sealed at the joining surface by the overmolding process.

Such a pipe system may also consist of more than two half shells 3a, 3b, 3c, 3d, 3e, 3f, 4a, 4b, 4c, 4d, 4e, 4f, for example, a larger pipe upper part, on which several smaller pipe upper parts are injection-molded together to form an overall system. Since the open pipe upper parts are accessible in the mold, it is possible to include the oil nozzles 5a, 5b, 5c, 5d, 5e, 5f directly by molding.

Also, one or more branches can be attached by molding onto a pipe 2a, 2b, 2c produced by injection molding, wherein the attached pipe elements may also have such a design that they themselves could not be produced as an integral injection molded part.

Alternatively to overmolding, it is also possible within the meaning of the present invention to mold such a pipe system as a pipe upper part and lower part and then to connect the half shells 3a, 3b, 3c, 3d, 3e, 3f, 4a, 4b, 4c, 4d, 4e, 4f by welding, especially hot-gas welding, to form a closed spray pipe 2a, 2b, 2c. It would be disadvantageous if weld expulsion occurred, and the precision of the spray pipe 2a, 2b, 2c could be prepared by welding only with lower precision.

According to the invention, three-dimensional spray pipes 2a, 2b, 2c that could not be prepared as individual parts by injection molding technique can be prepared. Thus, for example, a pipeline system with branches, deflections and nozzles 5a, 5b, 5c, 5d, 5e, 5f in the flow zone can be prepared. The entire pipe system is preferably made of plastic, especially of a thermoplast. The half shells 3a, 3b, 3c, 3d, 3e, 3f, 4a, 4b, 4c, 4d, 4e, 4f can remain in the respective half mold/mold cavities during the joining process. Assembly injection molding allows for a high precision of joining, which also allows small tubes with interior diameters of less than 3 mm to be produced.

"Components for a gear" herein means the components involved in the torque transmission for a corresponding transmission ratio, i.e., the load-leading pair of wheels as well as the corresponding synchronization means, optionally also neighboring bearings.

In accordance with the above referenced prior art, it is proposed that in oil lubrication of gears, especially dual clutch gears with two gearbox units, only the respectively load-leading gear or the respective set of wheels is lubricated. In this way, squeezing losses in the other wheel sets of the same gearbox unit, or preferably of the other gearbox unit in a dual clutch gear, are avoided.

According to a preferred embodiment, the lubricant is supplied only to the gears, i.e., to all the gears of a gearbox unit, of the load-leading driving shaft. This embodiment has the advantage that splashing and squeezing losses are sufficiently prevented with a lesser constructive expenditure as compared to lubricant supply to each gear. The lubricating oil is brought only to those regions of the gear where it is needed, namely the gearbox unit that is transmitting the torque. In this way, the lubricant is added in a controlled way. As compared to the simultaneous supply of lubricant oil to both gearbox units, less lubricant is required all in all, which also prevents oil shortage if conditions of oil deficiency should occur.

The device according to the invention preferably comprises the same number of spray pipes 2a, 2b, 2c as that of independent gears or gearbox units that are supplied. These spray pipes 2a, 2b, 2c are then pressurized with lubricant independently of one another.

According to a preferred embodiment, presently for supplying the two gearbox units, the lubricating device comprises an injection pipe 1 in the form of a support tube with two lubricant ports. For separation, the support tube 1 preferably has a wall by which the support tube 1 is separated into two oil spaces.

Thus, a lubricant or oil distributor pipe 1 with two parts is formed, wherein the respective portion consists of a separate oil compartment or a part of the lubricant or oil distributor pipe 1 and a separate oil port. It is also conceivable that the means for conveying the lubricant are not formed from a common separated lubricant or oil distributor pipe 1, but comprise separate independent parts, which are optionally pressurized with oil.

The oil ports are connected to oil lines (not shown) that communicate with the cooling oil circuit of the hydraulic control and can be pressurized with oil alternately.

To be able to add the lubricant oil according to need to the respectively load-leading or active gearbox unit, a switch element may be provided. Thus, it is achieved that only the respectively load-leading gearbox unit is supplied with oil.

More preferably, a thermoplast, especially an optionally glass-fiber reinforced material, for example, polyimide, also glass-fiber reinforced, or a polypropylene sulfide, also glass-fiber reinforced, may be employed as the joining material. The same materials may also be employed for the lubricant or oil distributor pipe 1.

If the component consists of plastic, it is more lightweight than a combination of metal and plastic.

The device according to the invention can be prepared by a fully automated method using a simple mold.

Apertures or nozzles may be injection-molded into the spray pipes 2a, 2b, 2c.

A distortion of parts can be minimized. A clean and economically efficient fabrication is possible.

Another embodiment of the present invention consists in a process for preparing the above defined device, which is characterized in that a lubricant or oil distributor pipe with at least one first half shell 3a, 3b, 3c, 3d, 3e, 3f and a spray pipe branching off therefrom is prepared, a second half shell 4, 4b, 4c, 4d, 4e, 4f congruent to said first half shell 3a, 3b, 3c, 3d, 3e, 3f is prepared, and the regions of the contact surfaces of the joining seams between the first half shells (3a, 3b, 3c, 3d, 3e, 3f) and the second half shells (4a, 4b, 4c, 4d, 4e, 4f) are connected by a bonding connection for engaging the first half shell (3a, 3b, 3c, 3d, 3e, 3f) to the second half shells (4a, 4b, 4c, 4d, 4e, 4f).

More preferably, the joining seams between the first half shells (3a, 3b, 3c, 3d, 3e, 3f) and the second half shells (4a, 4b, 4c, 4d, 4e, 4f) are welded, especially welded by hot gas, for engaging the first half shells (3a, 3b, 3c, 3d, 3e, 3f) with the second half shells (4a, 4b, 4c, 4d, 4e, 4f). Alternatively, it is also possible to engage the first half shells (3a, 3b, 3c, 3d, 3e, 3f) and the second half shells (4a, 4b, 4c, 4d, 4e, 4f) by injecting the joining seam between the first half shells (3*a*, 3*b*, 3*c*, 3*d*, 3*e*, 3*f*) and the second half shells (4*a*, 4*b*, 4*c*, 4*d*, 4*e*, 4*f*) with a joining material.

LIST OF REFERENCE SYMBOLS 1 lubricant or oil distributor pipe
2*a*, 2*b*, 2*c* spray pipe
3*a*, 3*b*, 3*c*, 3*d*, 3*e*, 3*f* first half shell
4*a*, 4*b*, 4*c*, 4*d*, 4*e*, 4*f* second half shell
5*a*, 5*b*, 5*c*, 5*d*, 5*e*, 5*f* nozzle
6*a*, 6*b*, 6*c*, 6*d* joining material

The invention claimed is:

1. A device for supplying a gear with a lubricant or for oil-cooling a piston in the engine of a motor vehicle, comprising a lubricant or oil distributor pipe having at least one spray pipe branching off therefrom for supplying the lubricant or oil to the respective components of the gear or engine, characterized in that said spray pipe comprises two half shells that are connected with one another by bonding connections in the region of the contact surfaces of a joining seam between the half shells.

2. The device according to claim 1, characterized in that one of the half shells is an integral component of said lubricant or oil distributor pipe.

3. The device according to claim 1, characterized in that said half shells are welded together in the region of the contact surfaces of the joining seam between the half shells.

4. The device according to claim 1, characterized in that said half shells are bonded together by a joining material in the region of the contact surfaces of the joining seam between the half shells.

5. The device according to claim 4, characterized in that said joining material comprises a thermoplast.

6. The device according to claim 1, characterized in that said lubricant or oil distributor pipe and/or said spray pipe comprises a thermoplast.

7. A process for preparing a device for supplying a gear with a lubricant or for oil cooling a piston in the engine of a motor vehicle comprising
providing a lubricant or oil distributor pipe with at least one first half shell and a spray pipe branching off therefrom,
providing at least one second half shell congruent to said first half shell,
providing a joining seam with a contact surface between the first half shell and the second half shell; and
connecting the contact surface of the joining seam between the first half shall and the second half shell by a bonding connection.

8. The process according to claim 7, further comprising the joining seam between the first half shell and the second half shell are welded.

9. The process according to claim 7, wherein the first half shell and the second half shell contain a joining seam between the first half shell and the second half shell and a joining material is injected into the joining seam for engaging the first half shell to the second half shell.

* * * * *